United States Patent
Duelk

(10) Patent No.: US 7,330,660 B2
(45) Date of Patent: Feb. 12, 2008

(54) OPTICAL TIME DIVISION MULTIPLEXER

(75) Inventor: Marcus Duelk, Atlantic Highlands, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 485 days.

(21) Appl. No.: 10/874,960

(22) Filed: Jun. 23, 2004

(65) Prior Publication Data

US 2005/0286894 A1  Dec. 29, 2005

(51) Int. Cl.
*H04J 14/02* (2006.01)
*H04B 10/04* (2006.01)

(52) U.S. Cl. .......................... 398/91; 398/75
(58) Field of Classification Search ............ 398/74–75, 398/101–102, 91–92
See application file for complete search history.

(56) References Cited

U.S. PATENT DOCUMENTS

| 5,991,477 | A  | * | 11/1999 | Ishikawa et al. | 385/24 |
| 6,614,583 | B1 | * | 9/2003 | Wachsman | 359/326 |
| 7,010,230 | B2 | * | 3/2006 | Lee et al. | 398/102 |
| 7,174,100 | B1 | * | 2/2007 | Wachsman | 398/47 |
| 2003/0228050 | A1 | * | 12/2003 | Geshel et al. | 382/149 |

OTHER PUBLICATIONS

Habbab, et al., DBR-Based Tunable Optical Filter, IEEE Photonics Letters, vol. 2, No. 5, May 1990, pp. 337 to 339.
Simsarian, et al., Wavelength Locking a Fast-Switching Tunable Laser, Dec. 11, 2003, pp. 1 to 4.
Matsuo, et al., A Widely Tunable Optical Filter Using Ladder-Type Structure, IEEE Photonics Technology Letters, vol. 15, No. 8, Aug. 2003, pp. 1114 to 1116.
Simsarian, et al., Fast Switching Characteristics of a Widely Tunable Laser Transmitter, IEEE Photonics Technology Letters, vol. 15, No. 8, Aug. 2003, pp. 1038 to 1040.
Agility Communications, Inc., Agility 4245 Widely Tunable Laser Transmitter, Product Data Sheet, Jul. 16, 2003, pp. 1 to 5.

* cited by examiner

*Primary Examiner*—Leslie Pascal

(57) ABSTRACT

A TDM comprising: (a) at least two wavelength-tunable devices for outputting a signal, each wavelength-tunable device being adapted to change signal wavelength in response to a change signal; (b) a plurality of on-off gates, one on-off gate being coupled to the output of each wavelength-tunable device such that, when a gate is on, the signal of its respective wavelength-tunable device passes through, and, when it is off, the signal of its respective wavelength-tunable device does not pass through, the gates being configured such that a gate is switched off when its respective wavelength-tunable device receives a change signal, and, when one gate is turned off, another gate is turned on; and (c) a combiner coupled to the outputs of all the gates for combining the outputs on a single transmission line.

27 Claims, 3 Drawing Sheets

OPTICAL TIME DIVISION MULTIPLEXER

FIELD OF INVENTION

This invention relates generally to a time division multiplexer of optical signals and, more specifically, to an optical time division multiplexer using wavelength-tunable devices such as tunable lasers and filters.

BACKGROUND OF INVENTION

Future generations of high-capacity packet switches, cross-connects and other telecommunication apparatus will likely rely on internal optical switching technologies to overcome current limitations facing high-speed and high-capacity electronic switching, routing and transport. Additionally, there are numerous other applications for optical wavelength switching technologies that have been discussed recently, including, for example, future optical metro or access networks, optical memory access, optical supercomputing, and optical processing in general. A common factor among these applications is that a particular function (e.g. port switching, packet routing, memory access, etc.) depends on the wavelength of an optical input signal. For example, in a router, the function of directing a signal to a particular output port depends upon the wavelength of the signal. These functions are referred to herein as "wavelength-dependent functions."

Of particular interest herein are wavelength-dependent functions for signals which are "time division multiplexed" (TDM) on a single input line, meaning that different wavelength signals are interposed or "slotted" as a function of time on a single transmission line. This is a well known technique. For port routing or addressing based on a TDM signal, two main concepts should be distinguished. The first is a point-to-point transmission, in which the TDM signal is generated at the transmitter side by a time division multiplexer (TDM) transmitter. The second is a broadcast-and-select transmission, in which optical signals of varying wavelengths are combined from a number of fixed-wavelength transmitters. The broadcast-and-select transmission is sent to all ports, at which a bandpass receiver selects certain wavelengths to generate a TDM signal.

In a point-to-point transmission, the TDM transmitter generates a TDM signal. A typical TDM transmitter comprises a bank of lasers in which each laser generates continuously a particular wavelength output. Such lasers are referred to herein generally as "wavelength-dedicated devices." These wavelength-dedicated devices are coupled through gates to a common output line. If the gate is opened, the output of that particular laser is allowed to reach the common line, otherwise the output is block. In this way, the gates are turned on and off selectivity in response to electrical input signals to output a desired TDM optical signal on the output line. Since gating can be performed at very high rates and since dedicated wavelength lasers have extremely stable and reliable output, this TDM transmitter configuration has become widely used.

In a broadcast-and-select transmission, a bandpass receiver receives a wavelength division multiplexed (WDM) signal and outputs a TDM signal. A traditional bandpass receiver is similar in many resects to the TDM transceiver. A receiver comprises a passive optical demultiplexer to split the multi-wavelength signal into signals having discrete wavelengths. This demultiplexer comprises a dedicated filter for each signal wavelength. Like the TDM transmitter, the output of each filter is coupled to a common line. The TDM signal on the common line is controlled by switching on and off gates coupled to each filter. If the gate is opened, the output of that particular filter is allowed to reach the common line, otherwise the output is block. As with TDM transmitters, since gating can be performed at very high rates and since dedicated wavelength filters have reliable output, this TDM receiver configuration has become widely used.

Despite the popularity and reliability of the TDM transmitters and receivers described above, the fact that dedicated-wavelength devices are used makes these systems expensive and bulky. Therefore, there is a desire to replace these wavelength-dedicated devices with wavelength-tunable devices, such as tunable lasers and filters. It is anticipated that, by replacing these dedicated components in favor of more-versatile, wavelength-tunable devices, the transmitters and receivers can be simplified and miniaturized.

Unfortunately, tunable lasers and filters do not change their output fast enough to meet the requirements of many of today's routing and switching networks, much less future needs, particular in the computing and data access applications. Specifically, the wavelength-tunable devices require time to stabilize the frequency of their output once they initiate a change in wavelength output. This time is referred to herein as "settle time." For example, today's fastest tunable laser requires about 50 ns to achieve a stable signal of ±3 GHz. Such a delay may be insignificant for many applications, for example, a network based on the SONET (synchronized optical network) standard has a tolerance of about 50 ms, which is a great deal higher than this settle time, so the wavelength-tunable device can be essentially taken off-line while it is stabilizing without negatively affecting the network. However, other optical switching applications, such as high-capacity packet switching, are not as tolerant.

Thus, there is a need for TDM transmitters and receivers which use wavelength-tunable devices, but which are quick enough to meet existing and future optical switching needs. The present invention fulfills this need among others.

SUMMARY OF INVENTION

The present invention involves the recognition that coupling the speed of a time division multiplexer (TDM) with its quality (i.e., wavelength stability), retards the overall performance of the TDM. In other words, since outputting a stable wavelength signal and switching the signal quickly are functions which have competing objectives—quality versus speed, using a wavelength-tunable device to perform both the functions either compromises the speed at which the TDM switches or the quality of the outputted signal.

The present invention not only recognizes these competing functional objectives, but also provides a solution for optimizing them. Specifically, the present invention provides for a new TDM which decouples switching speed and frequency accuracy by combining sets of wavelength-tunable devices in "tandem operation" with high speed switches. To generate a TDM signal, quick switches alternate between the outputs of wavelength-tunable devices, which are already stabilized in signal wavelength. While the output of a particular device is switched off, that device has an opportunity to stabilize on a different output frequency before being turned back on. By combining a high-speed switch with a wavelength-tunable device, the functions of high speed switching and stable output can be assigned to the components best suited to handle them. The result is an extremely fast TDM with a stable, high quality signal.

Accordingly, one aspect of the present invention is a time division multiplexer TDM which segregates the functions of wavelength output and switching in different components. In a preferred embodiment, the TDM comprises: (a) at least two wavelength-tunable devices for outputting a signal, each wavelength-tunable device being adapted to change signal wavelength in response to a change signal; (b) a plurality of on-off gates, one on-off gate being coupled to the output of each wavelength-tunable device such that, when a gate is on, the signal of its respective wavelength-tunable device passes through, and, when it is off, the signal of its respective wavelength-tunable device does not pass through, the gates being configured such that a gate is switched off when its respective wavelength-tunable device receives a change signal, and, when one gate is turned off, another gate is turned on; and (c) a combiner coupled to the outputs of all the gates for combining the outputs on a single transmission line. In one embodiment, the TDM is a transceiver and the wavelength-tunable devices are tunable lasers. In another embodiment, the TDM is a receiver and the wavelength-tunable devices are tunable filters, each having a multi-wavelength input.

Another aspect of the invention is a method for time division multiplexing using wavelength-tunable devices in tandem with switches. In a preferred embodiment, the method comprises: (a) coupling the output of only one of a plurality of wavelength-tunable devices to an output line; (b) changing the wavelength of the output of at least one of said plurality of wavelength-tunable devices which are not coupled to said output line; (c) decoupling the coupled wavelength-tunable device from said output line and immediately coupling another of said plurality of wavelength-tunable devices which has a stable output to said output line; and (d) reiterating steps (b) and (c) at least once. In a preferred embodiment, in which there are N wavelength-tunable devices and each wavelength-tunable device has a settle time of $\Delta t$, step (c) is performed at a frequency of up to $(N-1)/\Delta t$.

DETAILED DESCRIPTION

Figure 1:
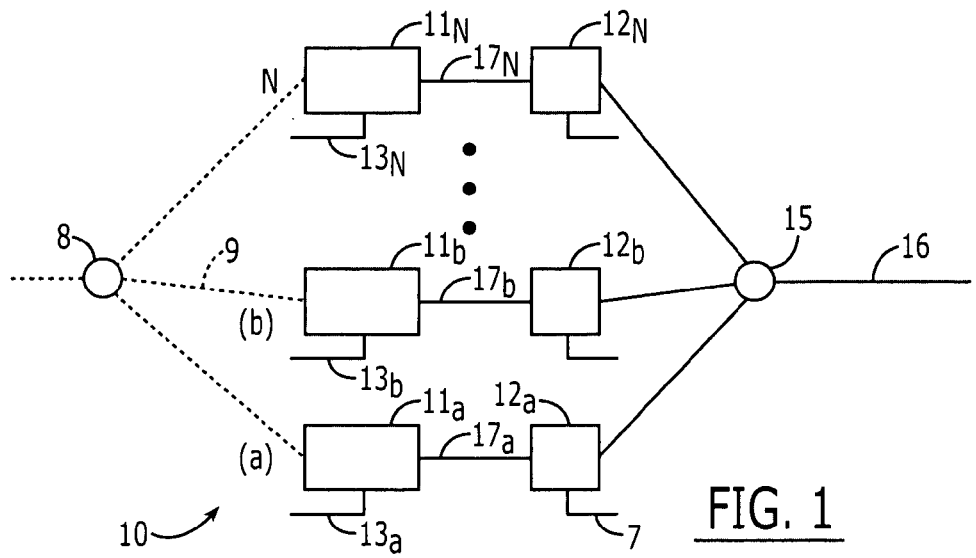
FIG. 1 is a schematic representation of a TWD transmitter of the present invention.

Referring to FIG. 1, a preferred embodiment of an N:1 time division multiplexer (TDM) 10 of the present invention is shown. The TDM 10 comprises N sets of wavelength-tunable devices $11a$, $11b$ ... $11_N$ in tandem with gates $12a$, $12b$ ... $12_N$ in which N is 2 or greater. Each wavelength-tunable device $11a$, $11b$ ... $11_N$ is adapted to output a signal $17a$ ... $17_N$ having a wavelength which is adjustable in response to a change signal $13a$, $13b$ ... $13_N$, respectively. One on-off gate is coupled to the output of each wavelength-tunable device. For example, as shown in FIG. 1, gate $12a$ is coupled to the output of wavelength-tunable device $11a$, and gate $12b$ is coupled to the output of wavelength-tunable device $12a$. When a gate is on, the signal of its respective wavelength-tunable device passes though, and, when it is off, the signal of its respective wavelength-tunable device does not pass through. The gates are configured such that a gate is switched off when its respective wavelength-tunable device receives a change signal. The gates are also configured such that at least one gate is turned on while the (N−1) remaining gates are turned off. The TDM 10 also comprises a combiner 15 which is coupled to the outputs of all the gates for combining the outputted signals on a single transmission line 16 to form a time division multiplexed signal. In the event the TDM of the present invention is used as a receiver (i.e., in a broadcast-and-select transmission environment), the TDM would also include optical input to the wavelength-tunable devices. This optical input would involve preferably splitting a multi-wavelength signal using a splitter 8 and inputting each split leg 9 into an input of the wavelength-tunable devices. These components and their functions are discussed in greater detail below.

Wavelength-tunable Devices

The wavelength-tunable devices may be any wavelength-tunable device which changes the wavelength of its output signal in response to a change signal. This output signal may be optical or electrical, although optical is preferred form the standpoint of system speed. Therefore, the wavelength-tunable device is preferably a wavelength-tunable laser if TDM 10 is a transmitter, and a wavelength-tunable filter if TDM 10 is a receiver.

Tunable lasers are well known. Such lasers are capable of generating and outputting an optical signal at a selected wavelength. To adjust or tune the wavelength of their output signal, tunable lasers may employ various means including mechanical switching, thermal switching and current injection. Of these means, current injection is preferred as it is the fasted. Tunable lasers which rely on current injection to alter the wavelength of the output are referred to herein as "electro-optical" tunable lasers. Such electro-optical tunable laser are known (see, e.g., Simsarian et al. Fast Switching Characteristics of a widely Tunable Laser Transmitter, IEEE Photonics Technology Letters, Vol. 15, No. 8, August, 2003), and commercially available from, for example, Agility Communications, Inc. (Santa Barbara, Calif.) (e.g., the Agility 4245 Widely Tunable Laser Transmitter).

Unlike a laser, a filter does not generate the signal which it outputs, but rather receives it as input along with other signals of varying wavelengths. The filter is tuned such that it outputs only a signal having the desired wavelength. Like tunable lasers, there are various means to adjust or tune the filter, although current injection is preferred form the standpoint of quickness. Such electro-optical filters are known and disclosed, for example, in I. M. I. HABBAB ET AL., DBR-Based Tunable Optical Filter, IEEE Photonics Technology Letters, Vol. 2, No. 5, May, 1990 and S. MATSUO ET AL., A Widely Tunable Optical Filter Using Ladder-Type Structure, IEEE Photonics Technology Letters, Vol. 15, No. 8, August, 2003.

The wavelength-tunable devices adjust the wavelength of their output signal in response to a change signal. The change signal contains the switching schedule and may comprise several drive signals for the wavelength-tunable device. Such change signals are well known. As mentioned above, when switching speed in the nanosecond regime is required, it is preferable to use wavelength-tunable devices based on current injection since mechanical or thermal switching is too slow. In current injection, the refractive index of the material of the device changes based on a changing electrical signal. The change of the refractive index in a region with a periodic geometric (e.g. refraction grating) structure results in a change of the spectral transmission or reflection characteristics which is then used in either a fast wavelength-tunable laser or filter.

The switching speed between output signals of different wavelengths is determined by the time needed to change the refractive index from the current value to a target value. This time depends on wavelength or frequency accuracy, which, in turn, depends on the accuracy of setting the target refractive index. Electronic parasitics in the tunable filter or tunable laser lead to bandwidth limitations so that the refractive index, and hence the optical wavelength of frequency, exhibits some sort of lowpass filter characteristic with a corresponding impulse response. The electronic circuits which drive the wavelength-tunable devices also require time to settle after a change.

Figure 2A:
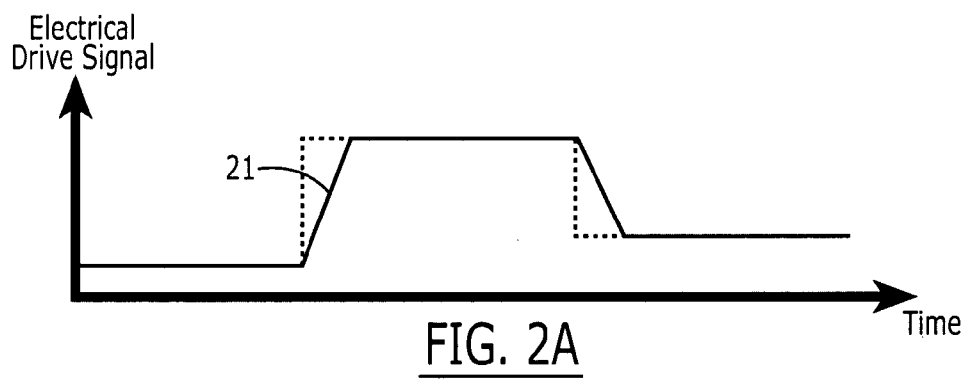
FIG. 2 illustrates the settle time required for a wavelength-tunable device such as a laser or filter.
Figure 2B:
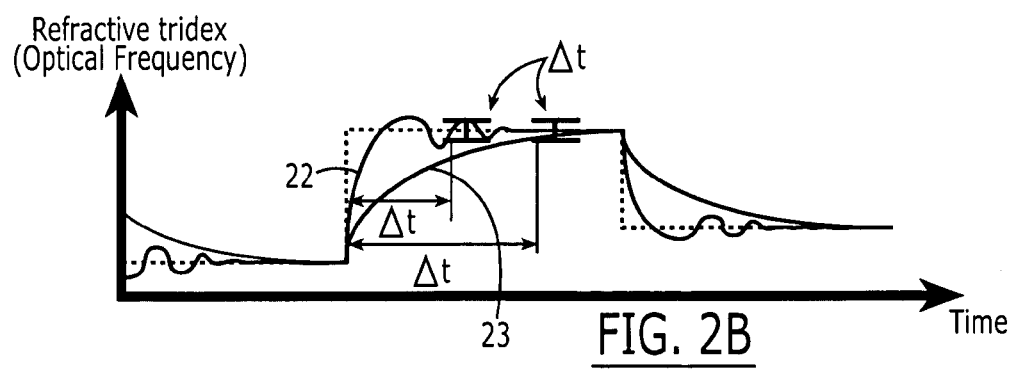

FIG. 2 shows schematically that the refractive index (Graph B) follows the electrical drive signal 21 (Graph A). Due to electronic parasitics in the wavelength-tunable device, the refractive index follows with a lowpass filter characteristics. Depending on the lowpass characteristics and the required frequency accuracy $\Delta f$, the signal reaches its target value after a settle time $\Delta t$. For example, in one situation, the signal 22 becomes stable after a relatively short $\Delta t$, while in another situation, the signal 23 takes a long time $\Delta t$ to stabilize. For example, today's fastest tunable lasers have settle times of about 50 ns to achieve ±3 GHz.

It should be understood that the settle time $\Delta t$ is a function of the frequency accuracy $\Delta f$—as $\Delta f$ increases, $\Delta t$ decreases, and vice versa. Thus, $\Delta f$, in effect, describes the quality of the signal, with a lower $\Delta f$ corresponding to a more precise wavelength. As used herein, a "settled" or "stable" signal is one having $\Delta f$ that is suitable for a given optical system. One skilled in the art can readily determine the required $\Delta f$ for a given system and, thus, the $\Delta t$ required to reach a stable signal. Preferably, a settled or stabilized signal has a $\Delta f$ of no less than about 10% of the channel spacing, and, more preferably, no less than about 5% of the channel spacing. If no $\Delta f$ is specified and if, for any reason, it cannot be determined, than $\Delta t$ can be assumed herein to be based on a $\Delta f$ of +/-3 GHz. Likewise, if, for any reason, $\Delta t$ cannot be determined even with a given $\Delta f$, than $\Delta t$ can be assumed to be no less than 50 ns for purposes of description herein. The impulse response of the wavelength-tunable device defines the settling behavior and hence the total switching time as discussed below with respect to the on-off gates.

On-off Gates

The on-off gate may be any component which can change between "on" and "off" states quicker than the settle time $\Delta t$ of the wavelength-tunable device. Suitable gates include, for example, a semiconductor optical amplifier (SOA), wherein the injection current switches the SOA between an optical transparent state and an optical absorbing state.

The gate must be switched in response to a switch signal 7, which is preferably a clock signal. The switch signal may be defined as a particular phase position of the clock position. For example, in a 2:1 TDM (i.e., N=2), the switch signal for a gate corresponding to one device may be the even clock schedule, while the switch signal for the gate of the other device may be the odd clock schedule.

As mentioned above, the gate must switch quicker than the settle time of its associated wavelength-tunable device. This is generally not a problem since gates can typically switch quicker than tunable device by several orders of magnitude. The reason for this is that changing the on/off states of a gate is a relatively coarse process—it does not require precision. Consequently, there is very little "settle time" for the gate to reach steady state. Indeed, steady state is not even required since the gate only needs to reach a state in which it either transmits or blocks the output of the wavelength-tunable device. Furthermore, the electronics used to effect a switch are much quicker than those that can be used typically for effecting the wavelength change. The reason for this is that the quick electronics used for switching also tend to be noisy. Since the "quality" of the switch signal is not particularly relevant as long as it is quick, these "noisy" electronics are acceptable.

The repetition frequency with which a given gate is switched is referred to herein as "switching frequency." The maximum switching frequency $f_{max}$ is a function of the wavelength-tunable device's settle time. That is, if the settle time is defined as $\Delta t$, than the maximum switching frequency is $f_{max}=1/\Delta t$ For example, if the settle time for a wavelength-tunable device is 50 ns, than the maximum frequency $f_{max}$ for a switch corresponding to that wavelength-tunable device would be 1/50ns or 20 MHz. A TDM with N tunable lasers has (N-1) tunable lasers that are settling to their target state while one of them is generating light output after the combiner, hence resulting in an increased maximum switching frequency of $f_{max}=(N-1)/\Delta t$. In a preferred embodiment, the switching frequency is not more than about 1% of $f_{max}$, and, more preferably not more than about 10% of $f_{max}$.

The switching frequency has a bearing on the minimum "slot length" of the TDM 10. The slot length is the segment length or time of a signal on the output line of the TDM 10. (Since TDM output is a function of time, slot length is stated in terms of time.) In the TDM configuration of the present invention, slot length is the period that a gate remains "on." Generally, a TDM with the ability to provide short slot lengths is desirable as it increases the signal density on the output line. In a 2:1 (i.e., N=2) TDM, the slot length can be no shorter than $\Delta t$. This is because the gate of one wavelength-tunable device must be "on" for $\Delta t$ to provide the other wavelength-tunable device with sufficient time to stable its signal. To achieve shorter slot lengths, the number of wavelength-tunable devices in the TDM 10 can be increased such that N is greater than 2. In this case, the TDM 10 would consist of N wavelength-tunable devices, followed by N optical on-off gates and an N:1 optical combiner. (If the TDM 10 of FIG. 1 is a receiver, it would have, instead of a 1:2 or 3 dB splitter, a 1:N optical splitter at the input.) A TDM with N wavelength-tunable devices has (N-1) tunable devices that are settling to their target state while one of them is coupled to the output line. This reduces the minimum theoretical slot length to $\Delta t/(N-1)$. Preferably, the slot length is no less than about 10 $\Delta t/(N-1)$, and, even more preferably, no less than about 100 $\Delta t/(N-1)$.

Preferably, the wavelength-tunable laser (or wavelength-tunable bandpass filter) and the optical on-off gate are both electro-optical wavelength-tunable devices because of the required nanosecond tuning and switching speed. It is also preferred for at least a portion of the wavelength-tunable devices and gates to be integrated on a single chip. In fact, wavelength-tunable lasers with integrated SOAs are commercially available from Agility (mentioned above). In one embodiment, the TDM 10 is packaged in one chip if N wavelength-tunable devices are monolithically integrated with N SOAs as on-off gates along with an optical coupler or combiner. For a TDM receiver, an additional optical coupler at the input is needed but can be also integrated on the same chip.

Time Division Multiplexing Method

Another embodiment of the present invention is an optical time division multiplexing method. In a preferred embodiment, the method comprises (a) coupling the output of only one of a plurality of wavelength-tunable devices to an output line; (b) changing the wavelength of the output of at least one of the plurality of wavelength-tunable devices which are not coupled to the output line; (c) decoupling the coupled wavelength-tunable device from the output line and immediately coupling another of the plurality of wavelength-tunable devices which has a stable output to the output line; and (d) reiterating steps (b) and (c) at least once.

It is important that step (c) be performed quickly so as to minimize gaps in the output of the TDM. Since the TDM of the present invention uses two or more wavelength-tunable devices, it can switch quickly between devices having stable outputs. In a preferred embodiment, step (c) is performed in less than $\Delta t$, more preferably, step (c) is performed in less than $\Delta t/10$ and more preferably in less than $\Delta t/100$. Put in other terms, step (c) is performed preferably in less than 5 ns, more preferably in less than 5 ns, and still more preferably in less than 0.5 ns.

As mentioned above, minimizing the slot length of a signal is important to increase the signal density of the output. Having multiple wavelength-tunable devices allows the TDM of the present invention to switch between devices very quickly and thereby reduce slot length. Specifically, it there are N wavelength-tunable devices and each wavelength-tunable device has a settle time of $\Delta t$, step (c) can performed at a frequency of up to $(N-1)/\Delta t$. This results in a minimum slot length of $\Delta t/(N-1)$ which is unprecedented in traditional optical TDMs. Although step (c) can be performed at a frequency of $(N-1)/\Delta t$, in practice it is likely to be longer, for example, less than $(N-1)/10\, \Delta t$ or even $(N-1)/100\, \Delta t$.

Applications

Figure 4:
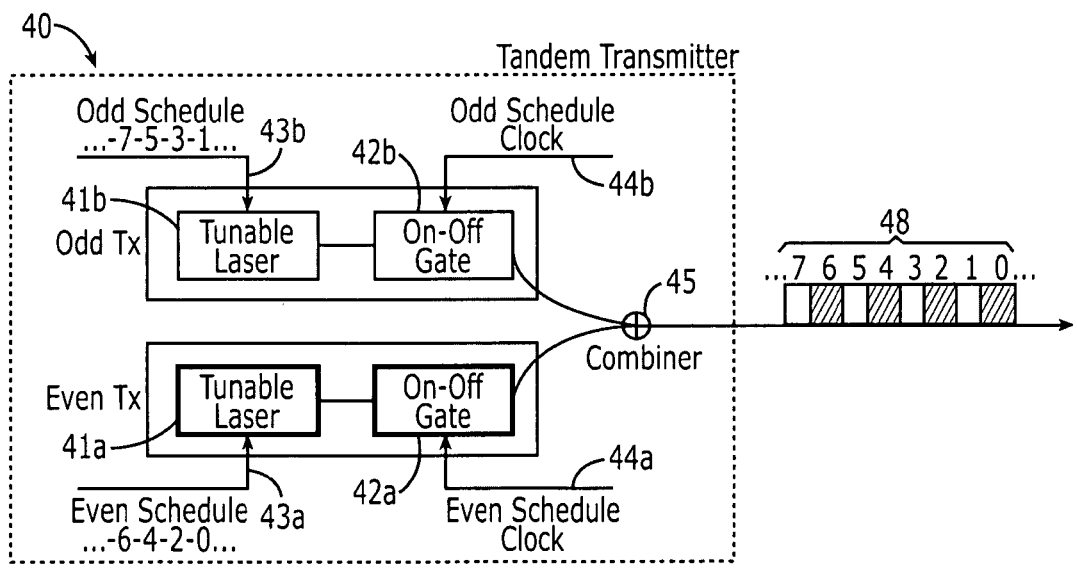
FIG. 4 is a schematic representation of a tunable TDM transmitter of the present invention for outputting a TDM signal.

The TDM 10 configuration of FIG. 1 is suitable for both transmitters and receivers. Referring to FIG. 4, an optical TDM transmitter 40 will be discussed in greater detail. The wavelength-tunable devices comprises two fast tunable lasers 41a, 41b which are driven by change signals 43a, 43b. Each tunable laser 41a, 41b is followed by a fast optical on-off gate 42a, 42b, respectively, which is driven with a clock signal 44a, 44b. The light output of both gates is coupled together by a combiner 45.

Figure 3:
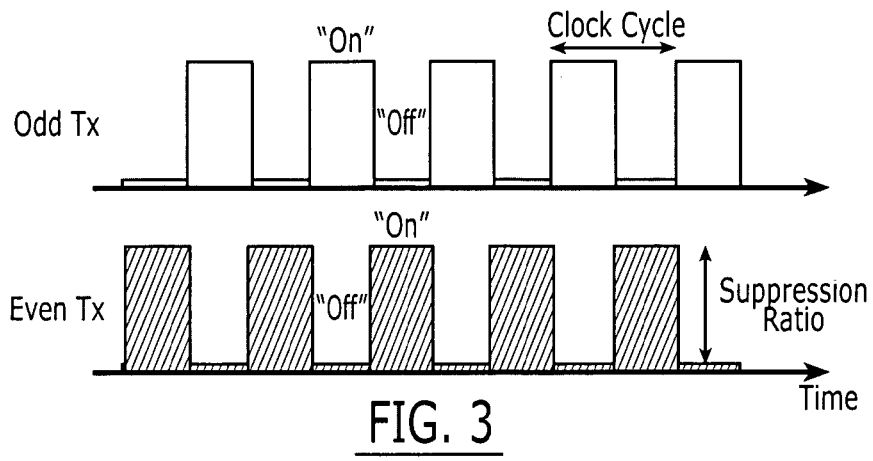
FIG. 3 shows the alternating "on" and "off" states for both tunable wavelength-tunable devices.

In a 2:1 TDM as shown in FIG. 4, the tunable lasers in conjunction with the optical gates are operated so that during half the clock cycle the gate is "on" while it is "off" for the second half of the clock cycle. A schematic of this operation cycle is shown in FIG. 3. During the "on" state, light from the tunable laser can transmit the gate and is coupled through the combiner into the output fiber. During the "off" state, the light output of the tunable laser is suppressed with a certain suppression ratio of the on-off gate. The schedules and their clock signals of both even and odd lasers are shifted by half a clock cycle. This means that, during the "off" period of the odd laser, the even laser "on" and vice versa. If the path lengths between the gates and the combiner as well as the clocking of the gates are adjusted for both lasers, the output after the combiner is a time-division multiplexed (TDM) signal 48 of both lasers, as indicated in FIG. 4.

During the "off" periods the tunable lasers are switched to the next wavelength channel which will be transmitted during the following "on" period. The "off" period has to be long enough to allow the tunable laser for settling on the target channel with the required frequency accuracy. This means that, supposing that both tunable lasers are roughly identical in their switching behavior and that only two tunable laser are employed (N=2), both "on" and "off" periods have to have the same duration. For a N:1 TDM where N is greater than 2, the "off" period is actually (N−1) times longer than the "on" period, which is desired if a long "off" period is needed due to long settling times, or if a short "on" period is required.

Figure 5:
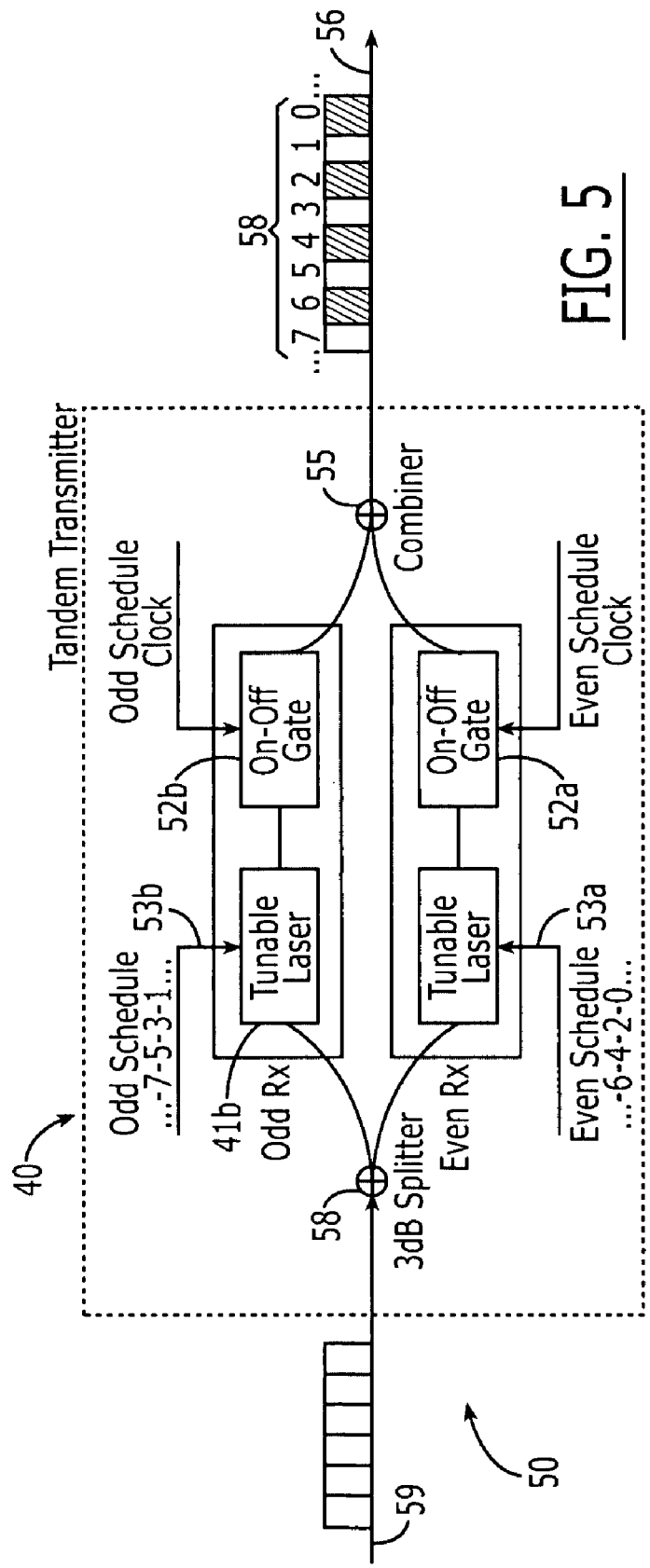
FIG. 5 is a schematic representation of a tunable receiver of the present invention for receiving a wavelength division multiplexed signal and outputting a TDM signal.

All the above mentioned characteristics and benefits of the tandem transmitter can be applied to a tandem receiver, in which the fast wavelength-tunable lasers are replaced by fast wavelength-tunable bandpass filters. One possible implementation is shown in FIG. 5. This scheme can be implemented in a broadcast-and-select architecture, as mentioned above, in which multiple wavelength channels are present at the receive side and one of them will be selected for data reception during a given time slot.

The TDM receiver 50 comprises a splitter 58 to split the multi-wavelength signal on input line 59 into two input signals—one input signal for each tunable filter 51a. 51b. Each tunable filter is adapted to change the center frequency of bandpass filter in response to a change signal 53a, 53b respectively, to allow a desired wavelength signal to pass through to the filter's output. The receiver 50 also comprises a plurality of on-off gates 52a, 52b. One on-off gate is coupled to the output of each tunable filter. For example, as shown in FIG. 5, gate 52a is coupled to the output of tunable filter 51a, and gate 52b is coupled to the output of tunable filter 52a. When a gate is on, the signal of its respective wavelength-tunable filter passes through, and, when it is off, the signal of its respective wavelength-tunable filter does not pass through. The gates are configured such that a gate is switched off when its respective wavelength-tunable device receives a change signal. The gates are also configured such that, when one gate is turned off, another gate is turned on. The receiver 50 also comprises a combiner 55 which is coupled to the outputs of all the gates for combining the outputted signals on a single transmission line 56 to form a time division multiplexed signal 58.

Compared to the conventional approach in which a passive 1:N optical demultiplexer is used as a fixed wavelength-selective filter followed by optical on-off gates at each of the N output ports and an additional N:1 optical multiplexer as a combiner, this scheme requires only two optical on-off gates and two wavelength-tunable filters. Therefore, this scheme offers same functionality at a much lower complexity.

What is claimed is:

1. A time division multiplexer comprising:
   at least two wavelength-tunable devices, each wavelength-tunable device adapted to output a signal having a wavelength which is adjustable in response to a change signal; and
   a plurality of on-off gates, one of said gates being coupled between the output of each wavelength-tunable device and an output line such that, when the gate is on, the output of its respective wavelength-tunable device is coupled to said output line, and, when the gate is off, the output of its respective wavelength-tunable device is not coupled to said output line, said gates being configured such that a gate is switched off when its respective wavelength-tunable device receives a change signal, and, when one gate is turned off, another gate is turned on.

2. The time division multiplexer of claim 1, wherein said wavelength-tunable device is a tunable laser.

3. The time division multiplexer of claim 2, wherein said tunable laser is an electro-optical device.

4. The time division multiplexer of claim 1, wherein said wavelength-tunable device is a tunable filter.

5. The time division multiplexer of claim 4, wherein said tunable filter is an electro-optical device.

6. The time division multiplexer of claim 4, further comprising:
a splitter for splitting an incoming signal and for providing said signal to an input of each tunable filter.

7. The time division multiplexer of claim 1, further comprising:
a combiner coupled between each of said the gates and said output line, said combiner combining the outputs on a single output line to form a time division multiplexed signal.

8. The time division multiplexer of claim 1, wherein said output line is an optical fiber.

9. The time division multiplexer of claim 1, wherein said gate is an electro-optical device.

10. The time division multiplexer of claim 9, wherein said gate is a semiconductor optical amplifier.

11. The time division multiplexer of claim 1, wherein said gate is integrated with its respective wavelength-tunable device on a common chip.

12. The time division multiplexer of claim 1, wherein two or more wavelength-tunable devices and their respective gates are integrated on a common chip.

13. The time division multiplexer of claim 1, wherein all said wavelength-tunable devices and gates are integrated on a common chip.

14. The time division multiplexer of claim 1, wherein said gate is switched in response to a switch signal.

15. The time division multiplexer of claim 14, wherein said switch signal for a particular gate is a particular phase position of a clock signal.

16. The time division multiplexer of claim 1, wherein said gates are configured such that a gate is turned on only after its respective wavelength-tunable device has a stable signal.

17. The time division multiplexer of claim 1, wherein each wavelength-tunable device has a settle time and wherein said gates are configured to have a switching frequency no greater than the inverse of said settle time.

18. The time division multiplexer of claim 1, wherein there are N wavelength-tunable devices and each wavelength-tunable device has a settle time of $\Delta t$, each gate having a switching frequency up to $(N-1)/\Delta t$.

19. An optical time division multiplexing method comprising the steps of:
(a) coupling the output of only one of a plurality of wavelength-tunable devices to an output line;
(b) changing the wavelength of the output of at least one of said plurality of wavelength-tunable devices which are not coupled to said output line;
(c) decoupling the coupled wavelength-tunable device from said output line and immediately coupling another of said plurality of wavelength-tunable devices which has a stable output to said output line; and
(d) reiterating steps (b) and (c) at least once.

20. The method of claim 19, wherein a particular wavelength-tunable device has a settle time of $\Delta t$, and wherein an off time between said particular wavelength-tunable device being decoupled and coupled is no less than $\Delta t$.

21. The method of claim 20, wherein there are N wavelength-tunable devices, wherein said off time is no less than $10/\Delta t/(N-1)$.

22. The method of claim 20, wherein step (c) is performed in less than $\Delta t$.

23. The method of claim 20, wherein $\Delta t$ is less than 50 ns.

24. The method of claim 20, wherein step (c) is performed in less than $\Delta t/10$.

25. The method of claim 19, wherein step (c) is performed in less than 1 ns.

26. The method of claim 19, wherein there are N wavelength-tunable devices and each wavelength-tunable device has a settle time of $\Delta t$, wherein step (c) is reiterated at a frequency of up to $(N-1)/\Delta t$.

27. The method of claim 26, wherein step (c) is performed at a frequency of at least $(N-1)/100\Delta t$.

* * * * *